UNITED STATES PATENT OFFICE.

ADOLF JOLLES, OF VIENNA, AUSTRIA-HUNGARY.

PROCESS OF OBTAINING ALBUMINOUS SUBSTANCES.

SPECIFICATION forming part of Letters Patent No. 707,423, dated August 19, 1902.

Application filed May 29, 1902. Serial No. 109,567. (Specimens.)

*To all whom it may concern:*

Be it known that I, ADOLF JOLLES, a subject of the Emperor of Austria-Hungary, residing at Vienna, in the Province of Lower Austria, in the Empire of Austria-Hungary, have invented certain new and useful Improvements in Processes of Obtaining Albuminous Substances; and I do hereby declare the following to be a full, clear, and exact description of the invention, such as will enable others skilled in the art to which it appertains to make and use the same.

Considering the great importance of the albuminous substances, especially those of animal origin, for nutrition, the manufacturers of foods have long sought, as is known, to obtain economically a pure, colorless, odorless, and tasteless preparation of albumen from the magma of blood-corpuscles separated from the blood. The dark color and the more or less persistent disagreeable smell and taste are objections to the use of the erythrocyte-albumen separated and freed from the constituents of the serum of the blood, which are useless for nutrition, and in part, indeed, injurious, in the known manner by precipitation by means of alcohol from the magma of blood-corpuscles to which ether has been added and pressing and washing with water. Moreover, these objectionable properties prevent the necessary appearance being imparted to a nutritive preparation made by mixing such erythrocyte-albumen with other foodstuffs or foods, such as flour, and render it impossible to make such preparations quite odorless and tasteless. The decolorization of the magma of blood-corpuscles or erythrocyte-albumen obtained from the blood cannot, however, be effected by known methods, save incompletely and with insufficient economy, for by allowing hydrogen peroxid to act on the previously-coagulated albumen the coloring constituents remain inclosed in the coagulum, and when hydrogen peroxid is allowed to act in the course of the coagulation process on the blood heated to 69° to 70° centigrade for the purpose of suspending the action of the oxydases there is the disadvantage that this preliminary heating of the blood for avoiding a premature coagulation of the albuminous substances must be exactly at 69° to 70° centigrade, so that the industrial application of the method is somewhat detailed and uncertain. Moreover, in consequence of the condition that the coagulation of the blood occurs simultaneously with the action of the hydrogen peroxid there can never be so complete a destruction of the coloring and similar impurities as when care is taken that the albumen remains in solution during the whole time that the said oxidant is acting.

The present invention relates to a process for obtaining, without the aforesaid disadvantages, a cheap foodstuff of high nutritive value in the form of a pure decolorized, odorless, and tasteless preparation of albumen of animal origin, such as is obtained by treating, in the manner described in the sequence, blood, or, better, the magma of blood-corpuscles obtained from the blood as such, or the erythrocyte-albumen separated therefrom or the purified blood-clot obtained when the blood is left at rest.

In its essence the present process consists in subjecting to the action of hydrogen peroxid the blood or the matter derived therefrom, as aforesaid, in a dissolved form, after first rendering ineffective the oxydases contained in it. From this the advantage follows that since the action of the peroxid is on dissolved albumen a more complete decolorization thereof is obtained with a smaller consumption of the said oxidant than when the albumen is treated in the undissolved state. Moreover, the decomposition of the added hydrogen peroxid without a decolorization of the albumen is prevented by the destruction of the oxydases present before the oxidation process according to this invention.

The practical operation of the process embodying the present invention is as follows: The material to be worked is first mixed with a substance, such as a very dilute solution of sulfurous acid, which acts as a poison for enzymes in order to destroy the oxydases present. The temperature proper for this step need not exceed 30° to 40° centigrade, as sulfurous acid destroys the oxydases already at this temperature, and thus the decomposition of the hydrogen peroxid afterward added to the material, as hereinafter set forth, and the rendering thereof ineffective by the oxydases is prevented. The material previously treated in the manner as before stated with sulfurous acid is next brought to a suitable degree of alkalinity by the addition thereto of an alkaline solution free from oxydases, such as ammonia. After the material has been brought to a degree of alkalinity in the manner as set forth hydrogen peroxid is added and the mass is boiled. The degree of alkalinity that the material is brought to is such that the albumen remains in solution when the liquid is boiled after the addition of hydrogen peroxid, so that the oxidizing action of the latter occurs throughout the whole mass. After the oxidizing action by the hydrogen peroxid the decolored albumen is precipitated by neutralizing the solution with dilute acid, filtered and purified in the known manner.

It is obvious that other substances which destroy oxydases may be used instead of sulfurous acid without departing from the essence of the present invention. Such substances are generally acids and bases of any known kind which at suitable concentration and duration of action act as enzyme poisons. It will also be obvious that instead of the ammonia for bringing the material to a suitable degree of alkalinity alkaline solutions or other materials free from the oxydases can also be used; but ammonia is especially suitable for the purpose before referred to, because in case an excess of alkali has been used an accumulation of salts in the subsequent neutralization of the solution may be avoided. Thus an essential simplification of the whole process may be achieved by using ammonia both for the preliminary treatment of the parent material—that is to say, for destroying the oxydases—and for preventing the precipitation of the albumen during the subsequent oxidation process.

It will be obvious that the process in question is not essentially changed if ammonia and hydrogen peroxids are not added as such, but are produced in the mass to be treated by interaction of an ammoniacal salt and a metallic peroxid.

It will be stated that only in case that a fixed alkali has been used as the solvent of the albumen during its treatment with hydrogen peroxid must the whole mass of the decolorized albumen be precipitated by subsequent neutralization of the alkaline solvent, for when ammonia is used the separation of the albumen after the completion of the oxidizing action of the peroxid occurs to a large extent spontaneously, owing to the volatilization of the ammonia during the heating.

Having thus fully described my invention, what I claim as new, and desire to secure by Letters Patent, is—

1. A process of obtaining an albuminous substance from magma or blood-corpuscles consisting in destroying oxydases in the material, bringing the material to a suitable degree of alkalinity, suitably oxidizing the alkalined material, and then suitably precipitating the albumen.

2. A process of obtaining an albuminous substance from magma or blood-corpuscles consisting in destroying the oxydases in the material by the suitable addition thereto of sulfurous acid, then bringing the material to a suitable degree of alkalinity, suitably oxidizing the alkalined material, and then suitably precipitating the albumen.

3. A process of obtaining an albuminous substance from magma or blood-corpuscles, consisting in destroying the oxydases in the material by suitably adding thereto a sulfurous acid, then bringing the material to a suitable degree of alkalinity by the addition thereto of ammonia, suitably oxidizing the alkalined material, and then suitably precipitating the albumen.

4. A process of obtaining an albuminous substance from magma or blood-corpuscles consisting in destroying the oxydases in the material by the addition thereto of sulfurous acid, then bringing the material to a suitable degree of alkalinity by the addition thereto of ammonia, suitably oxidizing the alkalined material by the addition thereto of hydrogen peroxid and the boiling of the mass, and then suitably precipitating the albumen.

In testimony that I claim the foregoing as my invention I have signed my name in presence of two subscribing witnesses.

ADOLF JOLLES.

Witnesses:
  JOSEF RUBERCH,
  ALVESTO S. HOGUE.